(12) United States Patent
Meados

(10) Patent No.: US 6,679,580 B2
(45) Date of Patent: Jan. 20, 2004

(54) POWER CONNECT FOR A PRINT CARRIAGE

(75) Inventor: David B. Meados, Albany, OR (US)

(73) Assignee: Agilent Technologies, Inc., Palo Alto, CA (US)

( * ) Notice: Subject to any disclaimer, the term of this patent is extended or adjusted under 35 U.S.C. 154(b) by 11 days.

(21) Appl. No.: 10/007,232

(22) Filed: Nov. 5, 2001

(65) Prior Publication Data

US 2003/0085946 A1 May 8, 2003

(51) Int. Cl.[7] ................................ B41J 1/08; B41J 1/56
(52) U.S. Cl. ...................... 347/37; 347/50; 400/320
(58) Field of Search ..................... 347/37, 50; 400/320, 400/320.1, 322, 352, 354; 346/139 R, 139 D

(56) References Cited

U.S. PATENT DOCUMENTS 5,334,920 A * 8/1994 Ito et al. ...................... 347/37
5,396,078 A * 3/1995 Klaus et al. .................. 347/37
6,123,470 A   9/2000 Chiu ........................... 400/320
6,130,695 A  10/2000 Childers et al. ............... 347/85
6,290,333 B1  9/2001 Corrigan, III ................. 347/50

* cited by examiner

Primary Examiner—Stephen Meier
Assistant Examiner—Julian D. Huffman

(57) ABSTRACT

A printer having a power bus for delivery of power to a print carriage is disclosed. The power from the power bus is picked up by a charge pickup system mounted on the print carriage. The charge pickup system can include a conductor contact and a spring to pressure the conductor to maintain contact with the power bus. The power bus can be implemented on the slide bar or on a separate bus bar. A ground return bus can be used to provide ground lines to the print carriage.

6 Claims, 6 Drawing Sheets

POWER CONNECT FOR A PRINT CARRIAGE

BACKGROUND

The present invention relates to printers, and more particularly, to supplying power and signal to print carriages.

Some plotters and printers (collectively, "printers") such as those used with home or business personal computers (PC's) print each swath of text or graphics by moving pens or printheads (collectively, "pens") relative to paper moving through the printer. Typically, the pens are mounted on a motorized printer carriage that moves back and forth over the paper.

Typically, a flexible cable connects the carriage to a printer control system of the printer. In that configuration, the flexible cable delivers power, provides ground, and delivers data and control signals to the carriage, ultimately controlling the pens.

Such system is illustrated in FIG. 1. In FIG. 1, a printer 10 includes a printer carriage 12 connected to a printer control system 13 (hidden under a receiving station 14) via a flexible cable 18. The printer control system 13 is illustrated in FIG. 2 and can include power supply portion and a data and control portion. In the illustrated sample, the carriage 12 includes four pens 16. Further, in the illustrated sample, the flexible cable 18 is a "ribbon" cable including a plurality of flexible wires.

The flexible cable 18, tethering the print carriage 12 to the printer control system 13, degrades quality of the printer due to its mechanical nature. This is better illustrated using FIG. 2. FIG. 2 is a simplified schematic representation of the printer 10 of FIG. 1. Ideally, the pens 16, thus the carriage 12, of the printer 10 contact the plane 22 of the paper 24 at a normal angle to the plane 22 of the paper 24. Any angular rotation or torque of the carriage 12 relative to the plane 22 of the paper 24 decreases print quality. Such angular torque of the carriage 12 are caused by varying torsional forces (illustrated as a directed arc 26) exerted by the flexible cable 18 as it is stretched, compressed, or otherwise moved during the movement of the carriage 12. In the illustrated printer 10, the carriage 12 moves by sliding on a sliding bar 28 in the horizontal directions indicated by a directed line 30. The degree of torsional force 26 depends on various factors including mass, length, and stiffness of the flexible cable 18, current slackness and compression of the flexible cable 18, and speed of the movement of the carriage 12.

Further, the flexible cable 18 presents hurdles to improvements in print quality and speed. For example, print quality and speed can be improved by increasing the number of pens in the carriage. However, the increase in the number of pens requires heavier wire in the flexible cable 18 to carry more power. Moreover, the increase in the number of pens requires additional data lines in the flexible cable 18 to control the additional pens. The increase in the mass of the flexible cable increases angular torque 26 of the carriage 12 thereby reducing print quality. Moreover, the increase in the mass of the flexible cable 18 decreases the speed in which the carriage 12 can be moved thereby negating the gains in the print speed due to the additional pens.

Accordingly, there is a need for an improved apparatus to deliver power, data, and control to the printer carriage to overcome these shortcomings.

SUMMARY

These needs are met by the present invention. According to one aspect of the present invention, a printer has a power bus for delivery of power to a print carriage and a first charge pickup system for transfer of power from the power bus to the print carriage.

According to another aspect of the present invention, a printer comprising includes a power bus and a ground return bus. A first charge pickup system transfers power from the power bus to a print carriage. A second charge pickup system provides a ground return path to the print carriage. The first charge pickup system has a first conductor facilitating the transfer of power and a spring for maintaining contact between the power bus and the print carriage. The second charge pickup system has a second conductor connecting the print carriage to the ground return bus.

Other aspects and advantages of the present invention will become apparent from the following detailed description, taken in combination with the accompanying drawings, illustrating by way of example the principles of the invention.

DETAILED DESCRIPTION

Figure 1:
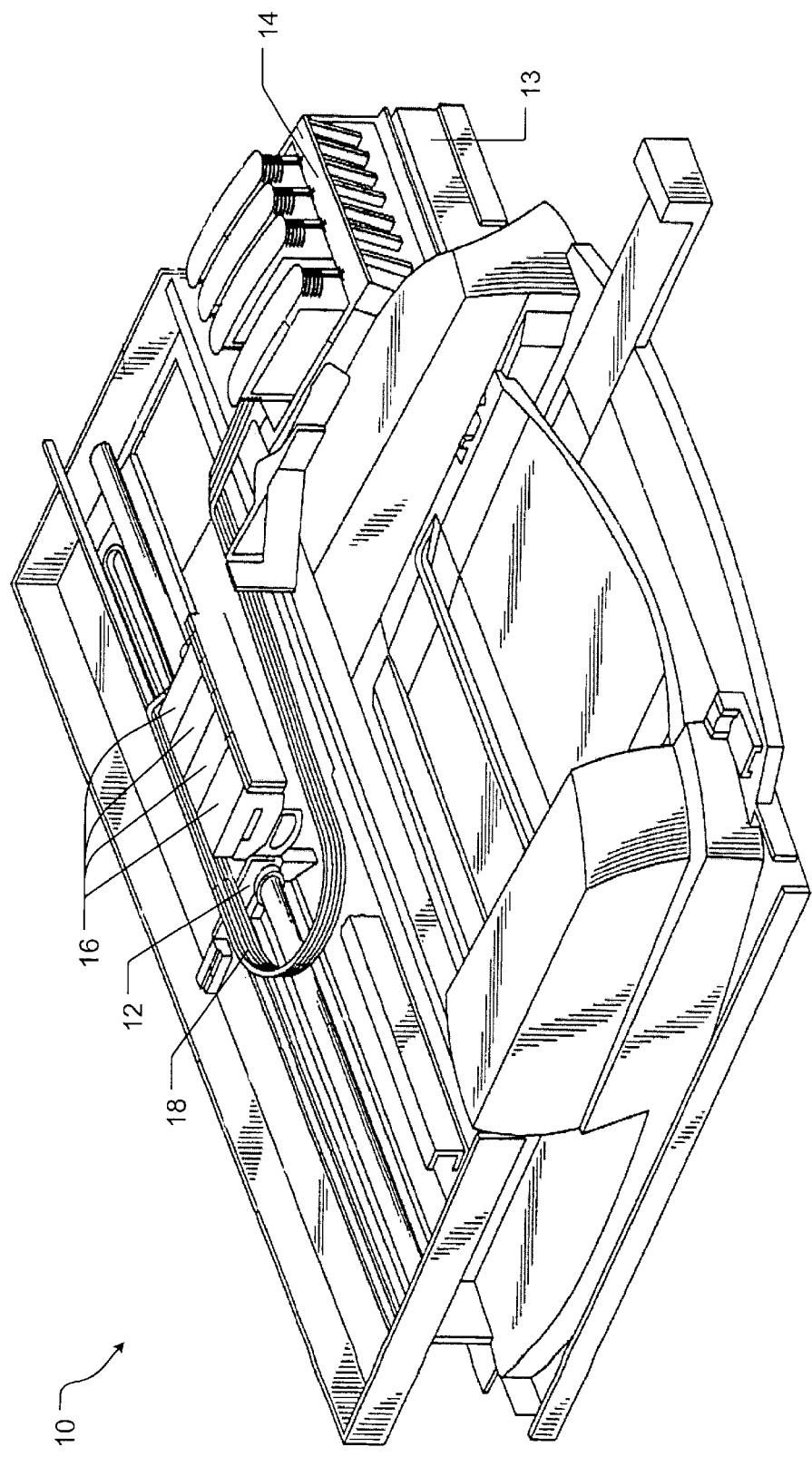
FIG. 1 illustrates a sample prior art printer.
Figure 2:
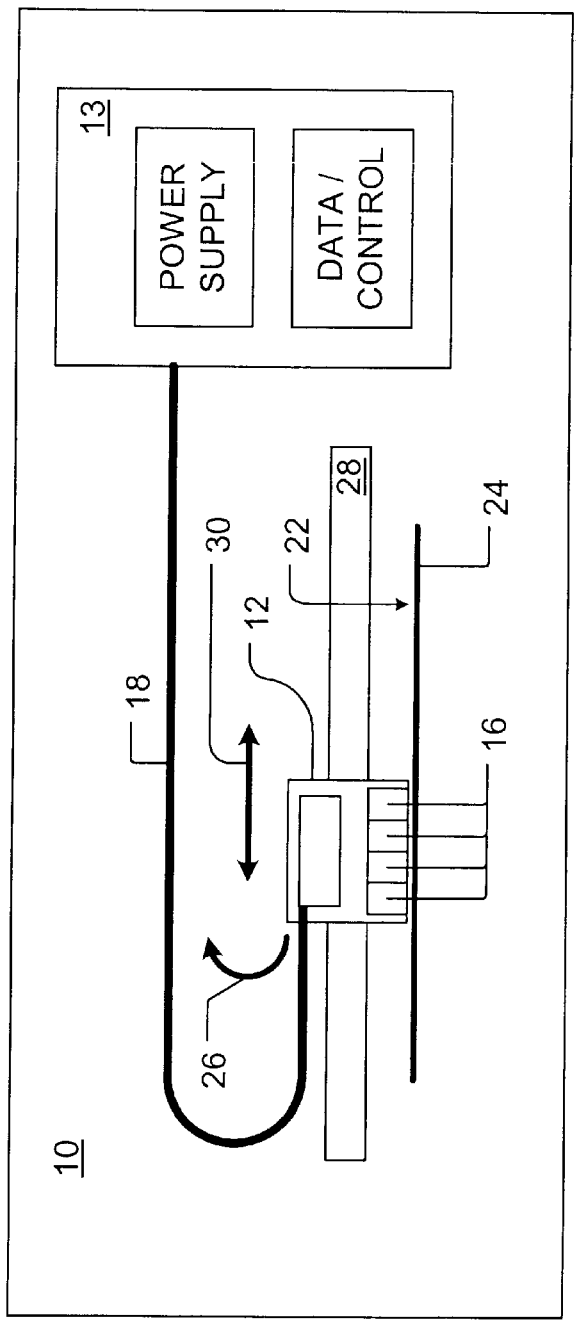
FIG. 2 is a simplified schematic representation of the printer of FIG. 1.

As shown in the drawings for purposes of illustration, the present invention is embodied in a printer having a print carriage that is not tethered to a printer control system via a flexible cable. In the present invention, the printer has a power bus for delivery of power to the print carriage and a charge pickup system for transfer of power from the power bus to the print carriage. Further, the print carriage has a wireless communication system including a wireless signal receiver and transmitter for communicating with the printer control system. Accordingly, the flexible cable is rendered unnecessary, thus eliminating or reducing the problems associated with the flexible cable.

Figure 3:
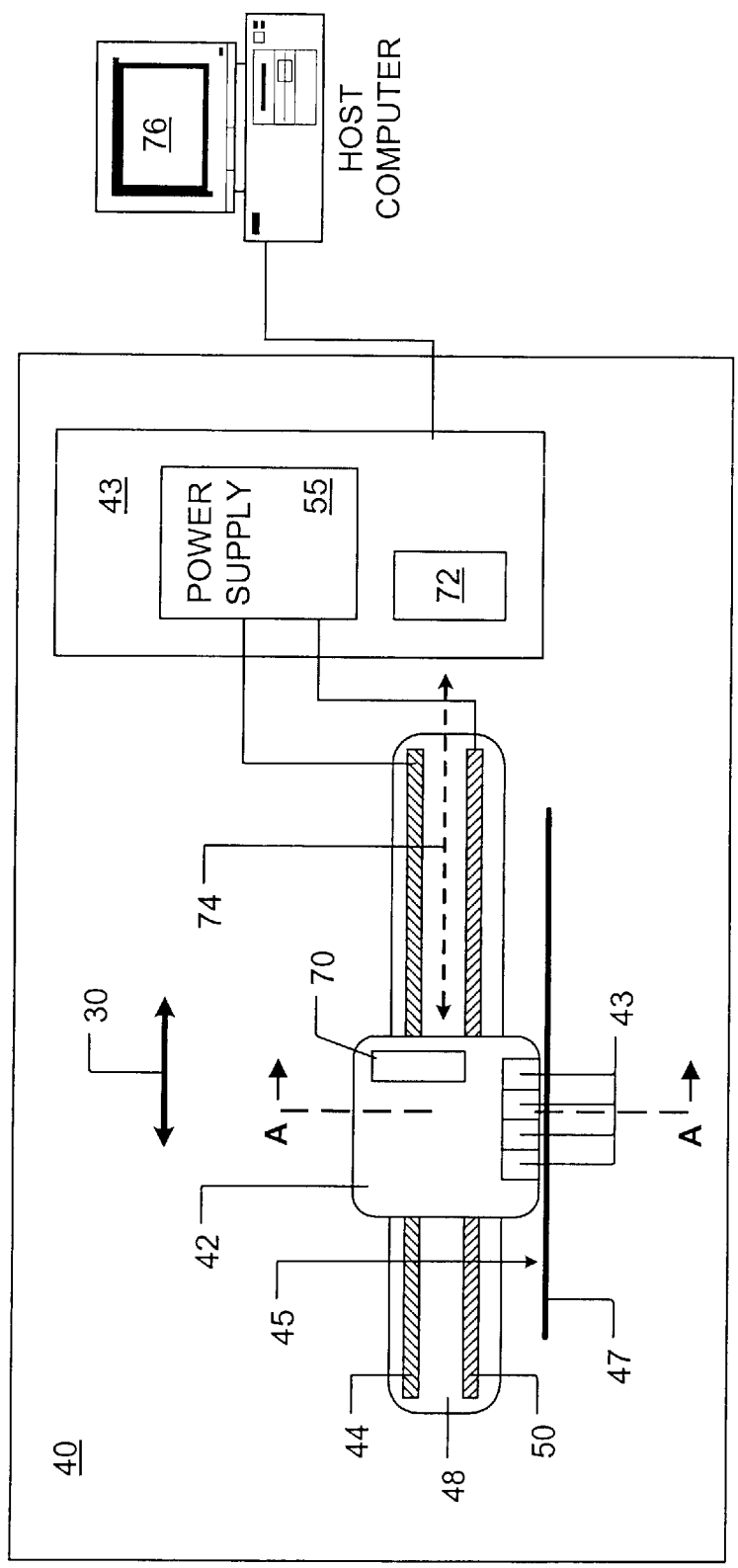
FIG. 3 is a simplified schematic representation of a printer and a host computer according to one embodiment of the present invention.
Figure 4:
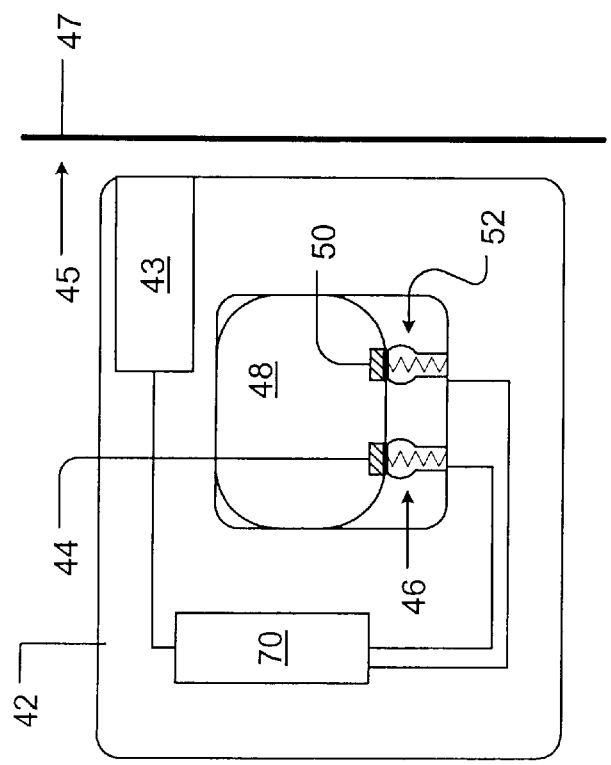
FIG. 4 illustrates a cut-away sectional view of a portion of the printer of FIG. 3.

FIG. 3 illustrates a simplified schematic representation of a printer 40 according to one embodiment of the present invention. In FIG. 3, the printer 40 includes a power bus 44 for delivery of power to a print carriage 42. The power from the power bus 44 is transfer to the print carriage 42 using a first charge pickup system 46 of FIG. 4. FIG. 4 illustrates a cut-away sectional view from line A—A of a portion of the printer 40 of FIG. 3 with one modification that the power bus 44 and a ground return bus 50 is shown on a top side of a slide bar 48 in FIG. 3 but on a bottom side of the slide bar 48 in FIG. 4.

FIG. 4 illustrates, inter alia, one possible embodiment of charge pickup systems of the printer 40. Referring to both FIGS. 3 and 4, the power bus 44 is connected to a printer control system 43 that provides power to the power bus 44. The first charge pickup system 46 connects the power bus 44 to the print carriage 42 thereby allowing transfer of power from the power bus 44 to the print carriage 42. Also illustrated in FIGS. 3 and 4 are paper 44 and pens 43. The pens 43 are attached to the print carriage 42 and positioned at a normal angle to the plane 45 of the paper 47. The directed line 30 indicates directions of movement of the print carriage 42.

The printer 40 also includes the ground return bus 50. The ground return bus 50 is connected to the printer control system 43. A second charge pickup system 52 connects the print carriage 42 to the ground return bus 50 for providing a ground return path to the print carriage 42.

Figure 5A:
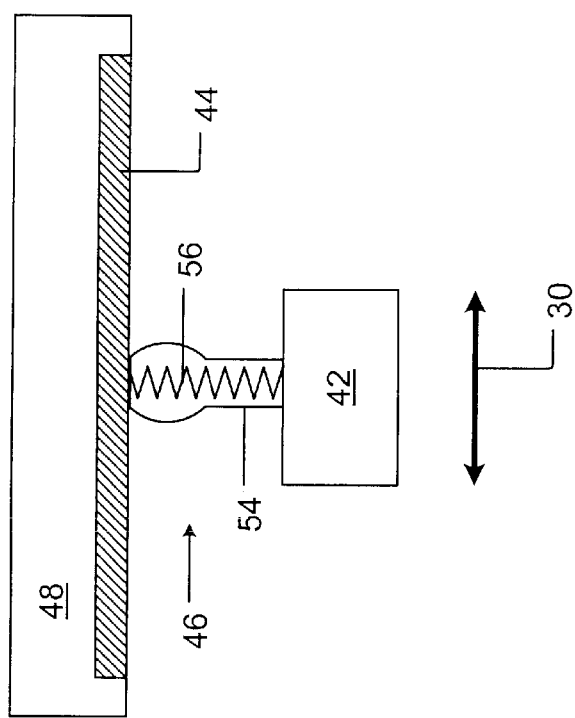
FIGS. 5A, 5B, and 5C illustrate alternative embodiments of charge pickup system in accordance with the present invention.
Figure 5C:
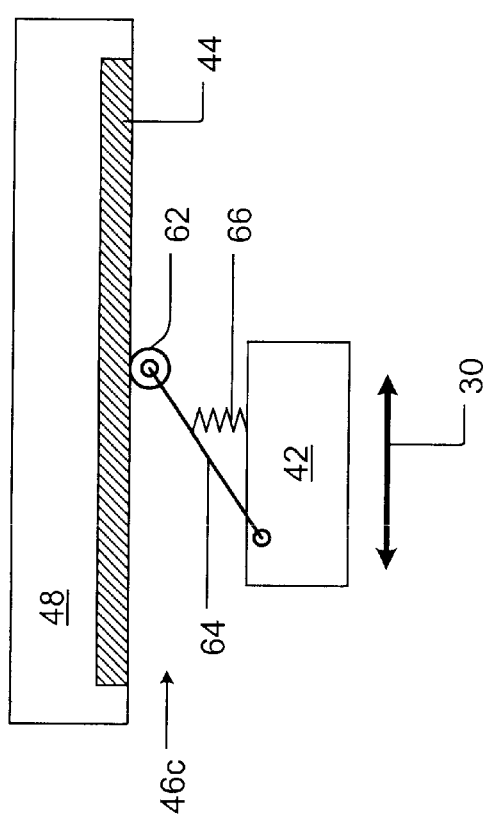
Figure 5B:
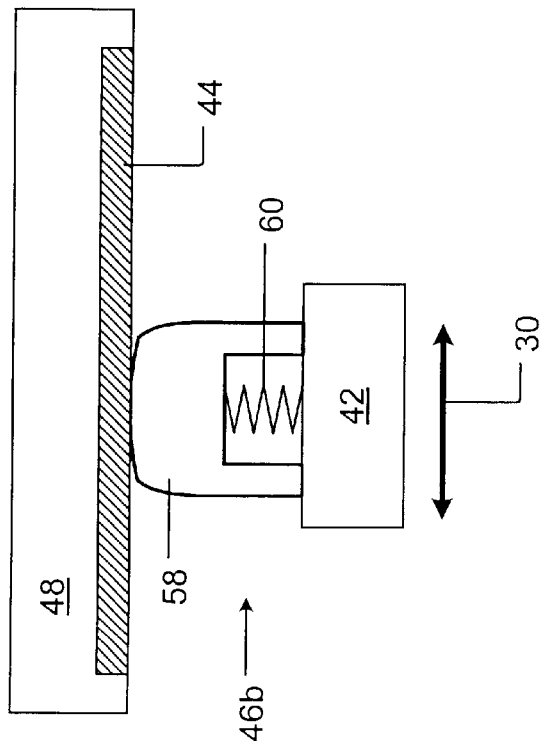

FIG. 5A is a simplified diagram illustrating one embodiment of the first charge pickup system 46 of FIG. 4. Here, the first charge pickup system 46 includes a steel spring conductor 54 to maintain contact between the print carriage 42 and the power bus 44. Further, a tension spring 56 can be used to assist the steel spring conductor 54 to maintain the connection. The second charge pickup system 50 can be configured similar to the first charge pickup system 46 as discussed herein using FIGS. 5A, 5B, and 5C. Portions of FIGS. 5A, 5B, and 5C are similar to each other and to those shown in FIG. 4. For convenience, components in FIGS. 5A, 5B, and 5C that are similar to components in FIG. 4 and to each other are assigned the same reference numerals, analogous but changed components are assigned the same reference numerals accompanied by a letter such as "b" and "c," and different components are assigned different reference numerals.

FIG. 5B a simplified diagram illustrating another embodiment of the first charge pickup system 46 of FIG. 4. This embodiment is referred using reference number 46b. Here, the first charge pickup system 46b includes a solid brush 58 and a spring 60 for applying pressure on the brush 58 to maintain contact between the brush 58 and the power bus 44 thereby maintaining contact between the power bus 44 and the print carriage 42.

FIG. 5C a simplified diagram illustrating yet another embodiment of the first charge pickup system 46c of FIG. 4. This embodiment is referred using reference number 46c. Here, the first charge pickup system 46c includes a conductor roller 62 connected to a steel spring 64 that is, in turn, connected to the print carriage 42. A tension spring 66 can be used to assist the steel spring 64 to maintain the contact between the roller 66 and the power bus 44. This conductor roller configuration minimizes friction between the power bus 44 and the print carriage 42.

As illustrated in FIGS. 3 to 5C, inclusive, one possible embodiment of the present invention includes the power bus 44 running along the slide bar 48 on which the print carriage 42 slides. Further, in the illustrated embodiments both the power bus 44 and the ground return bus 50 run along a bottom side, or underside, of the slide bar 48 to minimize possibilities of operator contact with the power bus 44 and the ground return bus 50. However, in another embodiment, the power bus can run along a bus bar separate from the slide bar 48. In fact, the bus bar can run along the slide bar 48.

Referring again to FIG. 3, the print carriage 42 includes a wireless communication system 70 including a wireless signal receiver and transmitter. Further, the printer control system 43 also includes a wireless communication system 72 including a wireless signal receiver and transmitter. The print carriage wireless communication system 70 can be a directional system such as an infra-red (IR) communication system. In such configuration, the printer control system's wireless communication system 72 is also an IR communication system and communications with the print carriage wireless communication system 70. Such line-of-sight wireless communication between the wireless communication systems 70 and 72 is indicated by dashed vector 74. In this configuration, the printer control system receives data and control signals from a Host Computer 76, and then communicates the data and control signals to the print carriage 42 via the IR communication methods using the wireless communication systems 70 and 72. Various IR communications methods are known in the art.

Alternatively, the print carriage wireless communication systems 70 can be implemented as a non-directional, or uni-directional, communication system. For example, Bluetooth communication protocol can be implemented by the print carriage wireless communication systems 70. Bluetooth is a computing and telecommunications industry specification that describes how computing and electronic devices communicate with each other using short-range wireless connections. The Bluetooth technology specifies that a low-cost transceiver chip, a microchip transceiver, be included in each device such as the print carriage 42. The microchip transceiver transmits and receives in a previously unused frequency band of 2.45 GHz that is available globally. Control and data signals can be sent via a Bluetooth connection. Each Bluetooth device has a unique 48-bit address from the IEEE 802 standard. Connections can be point-to-point or multipoint. The maximum range is about ten meters. At present, signals are exchanged at a rate of one megabit per second or more. A frequency hop scheme allows devices to communicate even in areas with a great deal of electromagnetic interference, thus making Bluetooth useful even in environments where multiple computing machines are in close proximity to each other.

Figure 6:
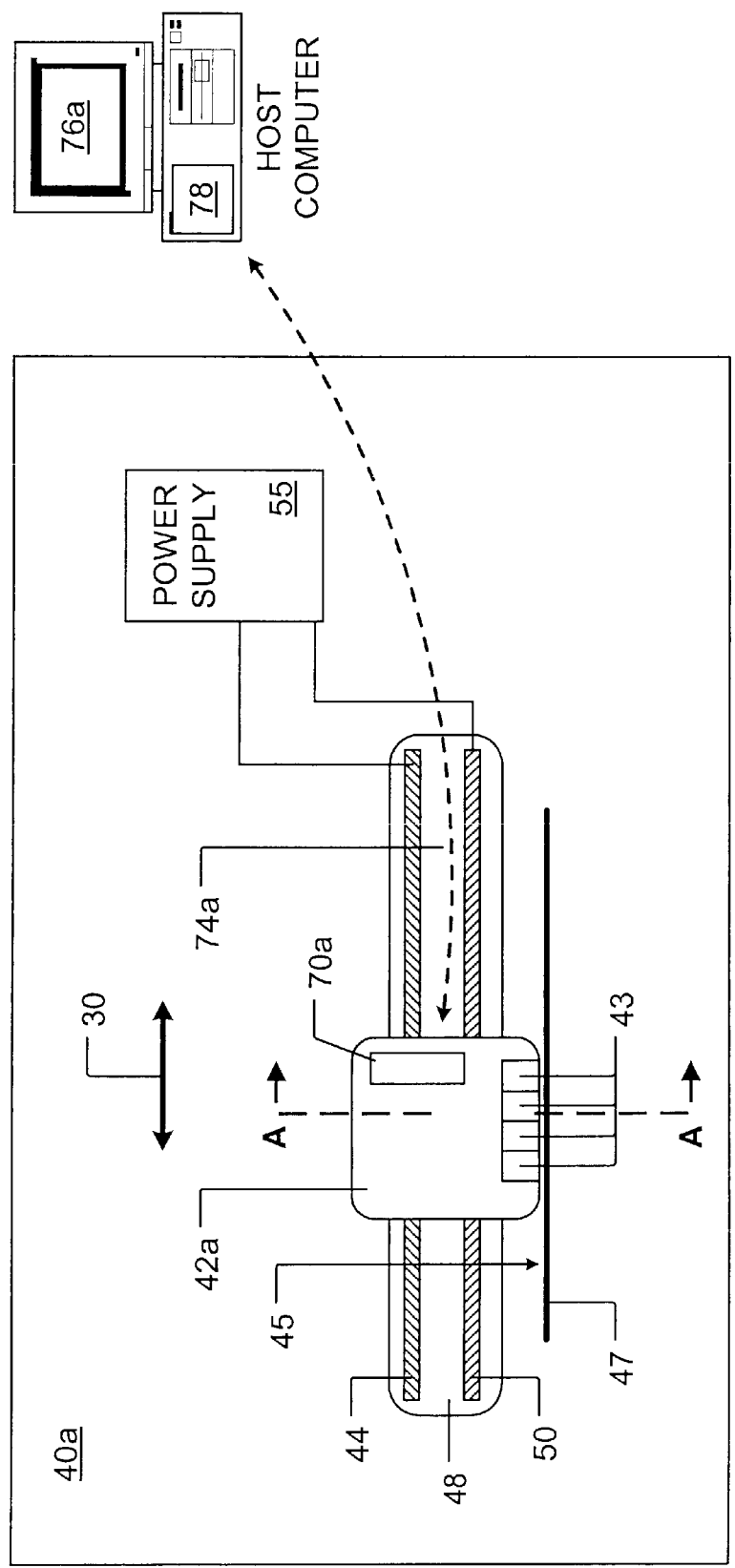
FIG. 6 is simplified schematic representation of a printer and a host computer according to another embodiment of the present invention.

In fact, using a non-directional wireless communication system on its print carriage, a printer 40 no longer requires a printer control system. An embodiment of the present invention having certain alternate configuration is shown in FIG. 6. Portions of this embodiment are similar to those shown in FIG. 4. For convenience, components in FIG. 6 that are similar to components in FIG. 4 are assigned the same reference numerals, analogous but changed components are assigned the same reference numerals accompanied by letter "a," and different components are assigned different reference numerals. In FIG. 6, a printer 40a does not include the printer control system 43 of FIG. 4 that receives data and control signals from the host computer 76. Rather, a non-directional wireless communication system 70a communications directly with the host computer 76 for reception and transmission of data and control signals. In this configuration, the host computer 76a includes its own wireless communication system a 78 to communicate with the print carriage wireless communication system 70a. Here, the host computer 76a printer transmits data and control signals. The print carriage 42a receives the data and control signals from the host computer 76a. The non-directional wireless communication between the wireless communication systems 70a (of the print carriage 42a) and 78 (of the host computer 76a) are indicated by dashed arc 74a.

From the foregoing, it will be appreciated that the present invention is novel and offers advantages over the current art. The present invention provides an apparatuses for delivery of power, ground, and control and data signals to a print carriage without using a flexible cable physically connecting the print carriage with the printer control system. Although specific embodiments of the invention are described and illustrated above, the invention is not to be limited to the specific forms or arrangements of parts so described and illustrated. The invention is limited only by the claims that follow.

What is claimed is:

1. A printer comprising:

a slide bar;

a power bus, a separate element from but attached to said slide bar, for delivery of power to a print carriage, said power bus running along said slide bar;

a first charge pickup system for transfer of power from the power bus to the print carriage.

2. The printer recited in claim 1 further comprising a ground return bus, and a second charge pickup system for connecting the print carriage to the ground return bus.

3. The printer recited in claim 1 wherein the first charge pickup system comprises a steel spring conductor to maintain contact between the print carriage and the power bus.

4. The printer recited in claim 1 wherein the power bus runs along a bus bar.

5. The printer recited in claim 1 wherein power bus runs along underside of the slide bar.

6. A printer comprising:

a slide bar;

a power bus and a ground return bus running along said slide bar, said power bus and said ground return bus being separate elements from but attached to said slide bar;

a first charge pickup system for transfer of power from the power bus to a print carriage;

a second charge pickup system for providing a ground return path to the print carriage;

the first charge pickup system having a first conductor facilitating the transfer of power and a spring for maintaining contact between the power bus and the print carriage; and the second charge pickup system having a second conductor connecting the print carriage to the ground return bus.

* * * * *